(12) United States Patent
Oshita

(10) Patent No.: US 9,069,431 B2
(45) Date of Patent: Jun. 30, 2015

(54) TOUCH PAD

(71) Applicant: ALPS ELECTRIC CO., LTD., Tokyo (JP)

(72) Inventor: Kazuhito Oshita, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/250,208

(22) Filed: Apr. 10, 2014

(65) Prior Publication Data

US 2015/0029139 A1  Jan. 29, 2015

(30) Foreign Application Priority Data

Jul. 24, 2013  (JP) .................................. 2013-153284

(51) Int. Cl.
*G06F 3/041* (2006.01)
*G06F 3/044* (2006.01)

(52) U.S. Cl.
CPC .......... *G06F 3/044* (2013.01); *G06F 2201/805* (2013.01); *G06F 2203/04104* (2013.01)

(58) Field of Classification Search
CPC ............ G06F 3/0414; G06F 2201/805; G06F 2203/04104

USPC ......................................................... 345/173
See application file for complete search history.

(56) References Cited

U.S. PATENT DOCUMENTS

| 8,059,102 | B2 * | 11/2011 | Rimon et al. ................. 345/173 |
| 2008/0087477 | A1 * | 4/2008 | Cho et al. ................... 178/18.01 |
| 2012/0081332 | A1 * | 4/2012 | Atsuta et al. ................. 345/174 |

* cited by examiner

*Primary Examiner* — Jonathan Boyd
(74) *Attorney, Agent, or Firm* — Beyer Law Group LLP

(57) ABSTRACT

A touch pad includes detection means for outputting a variable with respect to an operation surface, and control means for recognizing an operation finger candidate. In a case of one operation finger candidate, when a touch area exceeds a first threshold value, the control means determines the operation finger candidate to be an operation valid target finger. When a touch area does not exceed the first threshold value, the control means determines the operation finger candidate to be an operation invalid target finger. In a case of plural operation finger candidates, when a touch area exceeds a second threshold value indicating an area smaller than the first threshold value, the control means determines the operation finger candidate to be an operation valid target finger. When a touch area does not exceed the second threshold value, the control means determines the operation finger candidate to be an operation invalid target finger.

6 Claims, 6 Drawing Sheets

TOUCH PAD

CLAIM OF PRIORITY

This application claims benefit of Japanese Patent Application No. 2013-153284 filed on Jul. 24, 2013, which is hereby incorporated by reference.

BACKGROUND OF THE INVENTION

1. Field of the Invention

The present invention relates to a touch pad which is mounted on a personal computer and the like.

2. Description of the Related Art

In recent years, touch pads have become widespread which have a so-called multi-touch gesture recognition function of recognizing the movement of a plurality of fingers that are touched on a touch pad.

Incidentally, in a case of a single touch in which a touch of one finger is performed, there is a great tendency for an operation to be performed using a finger such as an index finger or a middle finger which is capable of being reliably touched to an operation surface. On the other hand, in a case of a large number of fingers like in a multi-touch, it may depend on a structure of a hand, and there is a tendency for a touch operation to be performed through a lateral side of a thumb or a fingertip. For this reason, in a case of a large number of fingers, there is a tendency for a touch area, a touch duration, and the like to be reduced as compared with a case of a small number of fingers. Accordingly, in a case of a large number of fingers, even when a finger is touched to an operation surface, the finger may be determined to be a finger floating in the air, and thus there is a problem in that the finger is not determined to be an operation valid target finger. In order to solve this problem, a determination condition such as a touch area and a touch duration may be loosely set. However, in that case, the finger floating in the air may be often determined to be an operation valid target finger, which results in another problem.

US Unexamined Patent Application Publication No. 2008/0087477 discloses that when a signal intensity exceeds a predetermined threshold value, it is determined that there is a touch of a finger, but there is the above-described problem.

SUMMARY OF THE INVENTION

The present invention provides a touch pad capable of making it easier to determine a touching finger to be an operation valid target finger in a case of a large number of fingers like in a multi-touch and making it easier to determine a finger floating in the air to be an operation invalid target finger in a case of a small number of fingers like in a single touch.

A touch pad according to an aspect of the invention includes detection means for outputting a variable according to a proximate state of a finger with respect to an operation surface; and control means for recognizing an operation finger candidate on the basis of the variable. In a case where the number of operation finger candidates is equal to or less than N (N is a natural number), when a touch state of the operation finger candidate exceeds a first condition indicating a touch intensity, the control means determines the operation finger candidate to be an operation valid target finger. When a touch state of the operation finger candidate does not exceed the first condition, the control means determines the operation finger candidate to be an operation invalid target finger. In a case where the number of operation finger candidates is equal to or greater than N+1, when a touch state of the operation finger candidate exceeds a second condition indicating a touch intensity smaller than that of the first condition, the control means determines the operation finger candidate to be an operation valid target finger. When a touch state of the operation finger candidate does not exceed the second condition, the control means determines the operation finger candidate to be an operation invalid target finger.

In the touch pad according to the aspect of the invention, in a case where the number of operation finger candidates is equal to or less than N, when a touch area of the operation finger candidate exceeds a first threshold value, the control means may determine the operation finger candidate to be an operation valid target finger. When a touch area of the operation finger candidate does not exceed the first threshold value, the control means may determine the operation finger candidate to be an operation invalid target finger. In a case where the number of operation finger candidates is equal to or greater than N+1, when a touch area of the operation finger candidate exceeds a second threshold value indicating an area smaller than the first threshold value, the control means may determine the operation finger candidate to be an operation valid target finger. When a touch area of the operation finger candidate does not exceed the second threshold value, the control means may determine the operation finger candidate to be an operation invalid target finger.

According to the present invention, in a case of a large number of fingers like in a multi-touch, a determination condition is loosely set, and thus it is possible to make it easier to determine a touching finger to be an operation valid target finger. In a case of a small number of fingers like in a single touch, a determination condition is strictly set, and thus an effect is exhibited which is capable of making it easier to determine a finger floating in the air to be an operation invalid target finger.

DESCRIPTION OF THE PREFERRED EMBODIMENTS

Figure 1:
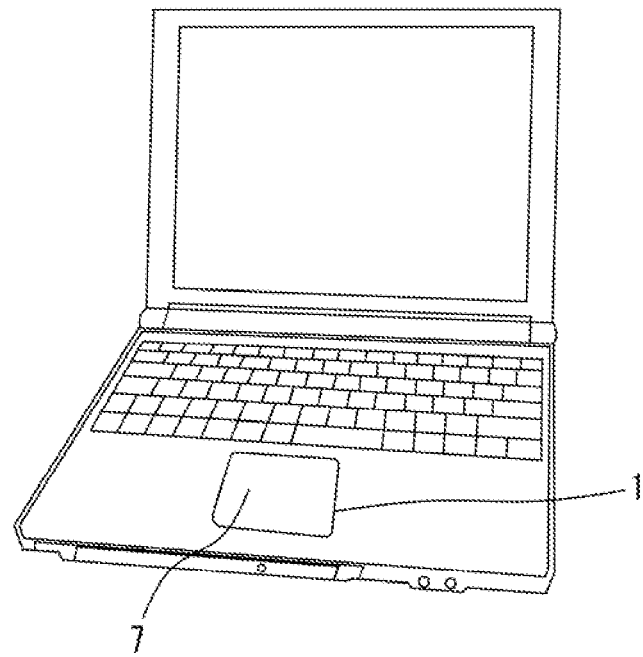
FIG. 1 is a diagram illustrating a state where a touch pad 1 is mounted on a personal computer.

FIG. 1 is a diagram illustrating a state where a touch pad 1 is mounted on a personal computer. An operation plate is attached to an uppermost surface of the touch pad 1, and the surface of the operation plate serves as an operation surface 7.

Figure 2:
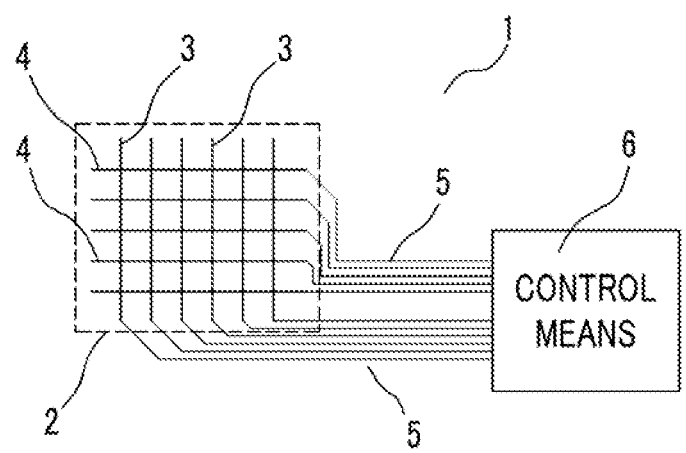
FIG. 2 is a system configuration diagram of the touch pad 1.

FIG. 2 is a system configuration diagram of the touch pad 1. The touch pad 1 includes a plurality of X electrodes 3 and a plurality of Y electrodes 4 which are laid in a substrate 2, and these electrodes are connected to control means 6 through wirings 5. The control means 6 applies a voltage using any one of the X electrodes 3 and the Y electrodes 4 as driving electrodes, detects a voltage using the other one thereof as detecting electrodes, and detects a change in capacitance in a case where a finger or the like approaches the substrate 2, thereby calculating coordinates of the finger or the like.

Meanwhile, the X electrodes 3 and the Y electrodes 4 of this embodiment are detection means that outputs a voltage converted into a capacitance value. However, the present invention is not limited thereto, and a method of detecting and outputting other variables such as, for example, pressure of a finger may be used.

Figure 3:
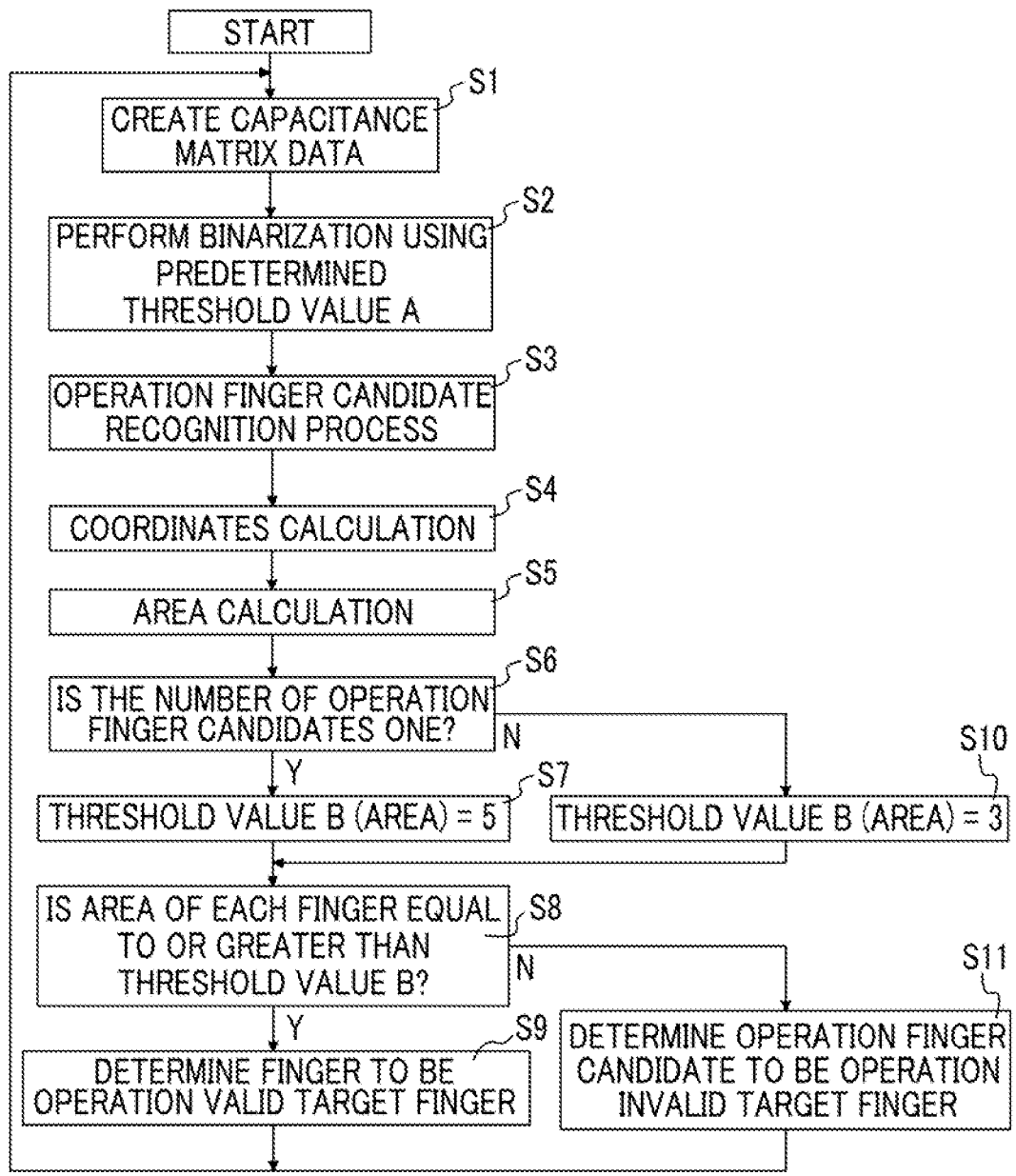
FIG. 3 is a flow chart of control means 6.

FIG. 3 is a flow chart of the control means 6. An operation of the touch pad 1 according to this embodiment will be described below with reference to FIG. 3.

First, in step S1, capacitance matrix data is created. The matrix data is obtained by calculating a capacitance value for each position on the basis of a driving situation of the driving electrode and a voltage detected by the detecting electrode.

Next, in step S2, binarization is performed using a predetermined threshold value A. The calculated capacitance value is compared with the predetermined threshold value A (for example, a capacitance value=5). When the capacitance value exceeds the predetermined threshold value A, 1 is set, and when the capacitance value does not exceed the threshold value A, 0 is set.

Next, in step S3, an operation finger candidate recognition process is performed. This process is a process of recognizing a connected region 10 in which portions having binarized data being 1 are contiguously present and of recognizing the connected region 10 as an operation finger candidate. In addition, here, the number of operation finger candidates is also recognized.

Next, in step S4, coordinates calculation is performed. The term "coordinates" used herein corresponds to, for example, a centroid of the connected region 10, and is used for movement control of a pointer displayed on a screen, and the like.

Next, in step S5, area calculation is performed.

Next, in step S6, it is determined whether the number of operation finger candidates is one. When the number of operation finger candidates is one, the operation proceeds to step S7 to set a threshold value B indicating an area to 5, for example. When the number of operation finger candidates is two or more, the operation proceeds to step S10 to set the threshold value B to 3, for example.

Next, the operation proceeds to step S8 to determine whether an area of each finger is equal to or greater than the threshold value B. When the area of each finger is equal to or greater than the threshold value B, the operation proceeds to step S9 to determine the finger to be an operation valid target finger. When the area of each finger is not equal to or greater than the threshold value B, the operation proceeds to step S10 to determine the finger to be an operation invalid target finger. Meanwhile, in this embodiment, an area is used as a criterion for determination of whether being an operation valid target finger or an operation invalid target finger. However, the present invention is not limited thereto, and the duration with respect to a predetermined area, pressure, or the like may be used as a criterion of determination.

Figure 4:
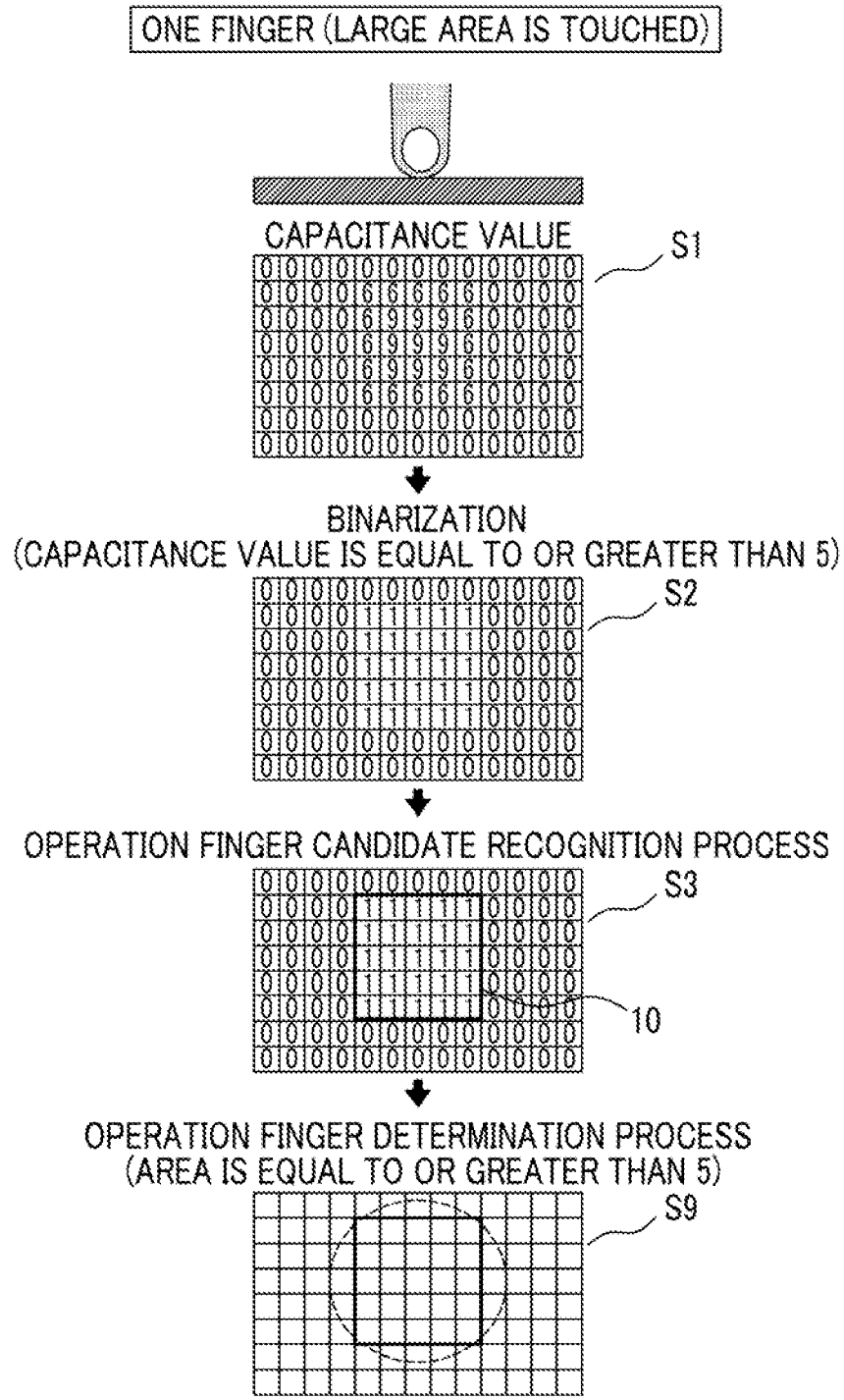
FIG. 4 is a diagram visually illustrating an operation of the control means 6.

FIG. 4 is a diagram visually illustrating an operation of the control means 6 when a large area is touched by one finger. When an operator attempts to perform an operation using one finger, there is a tendency for the operator to generally perform a sliding operation or the like in a state where a large area is touched by an index finger, a middle finger, or the like. For this reason, as will be described later, it is preferable that the threshold value B be set to a high value in order to prevent an unintended operation from being performed by a finger floating in the air, or the like. When a touch area of an operation finger candidate exceeds the threshold value B (herein, 5), in step S9, the operation finger candidate is determined to be an operation valid target finger. Data such as coordinates is reflected in gesture recognition, pointer movement control, and the like.

Figure 5:
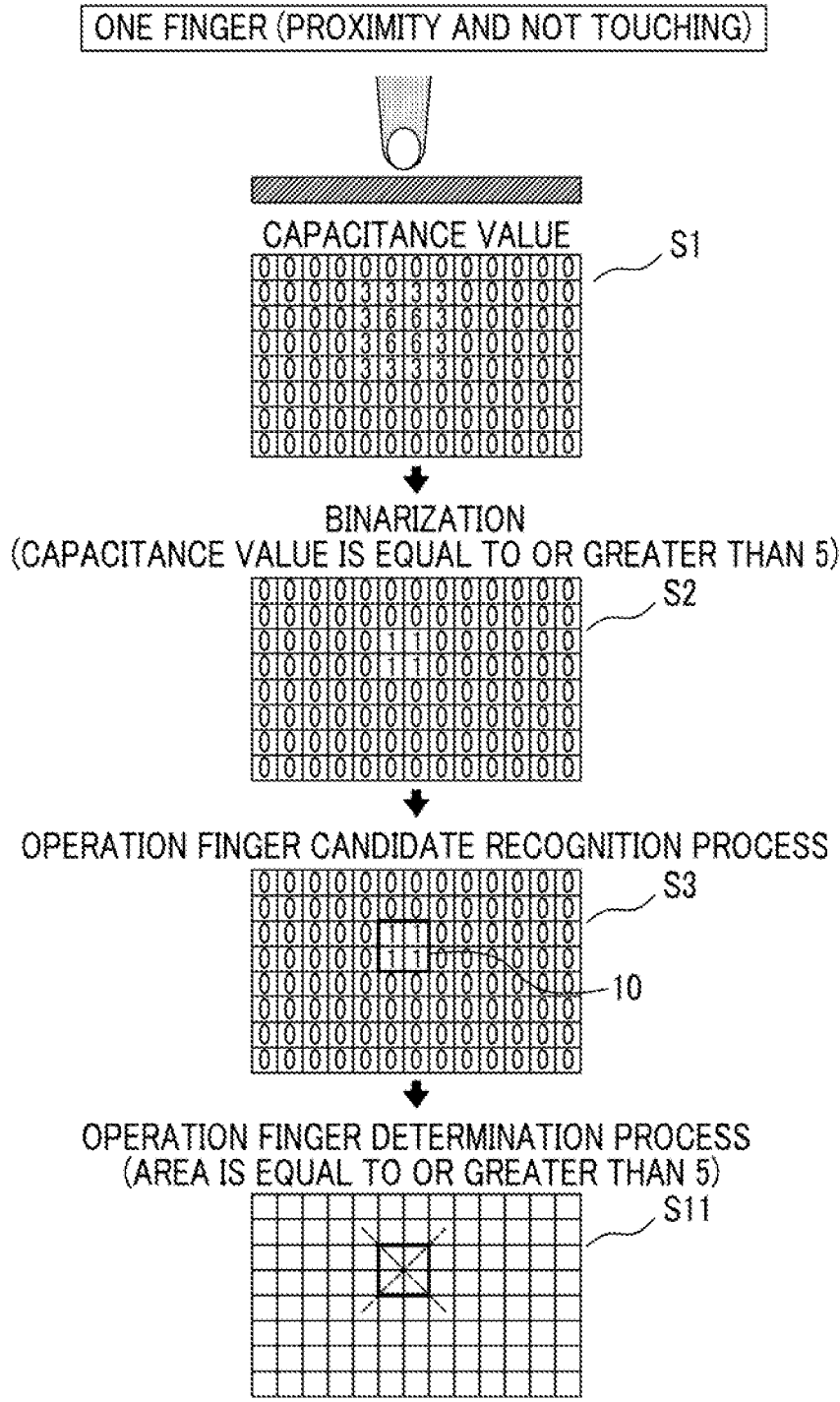
FIG. 5 is a diagram visually illustrating an operation of the control means 6.

FIG. 5 is a diagram visually illustrating an operation of the control means 6 when one finger is in a proximate state without being touched. For example, when an operator operates a keyboard, the operator may move his or her own finger, palm, or the like in a space on the touch pad 1. However, at this time, a user's unintended operation may be performed due to the reaction of the touch pad 1. In order to avoid such a situation, when a touch area of an operation finger candidate exceeds a threshold value B (herein, 5), in step S11, the operation finger candidate is determined to be an operation invalid target finger. Data such as coordinates is not reflected in gesture recognition, pointer movement, and the like.

Figure 6:
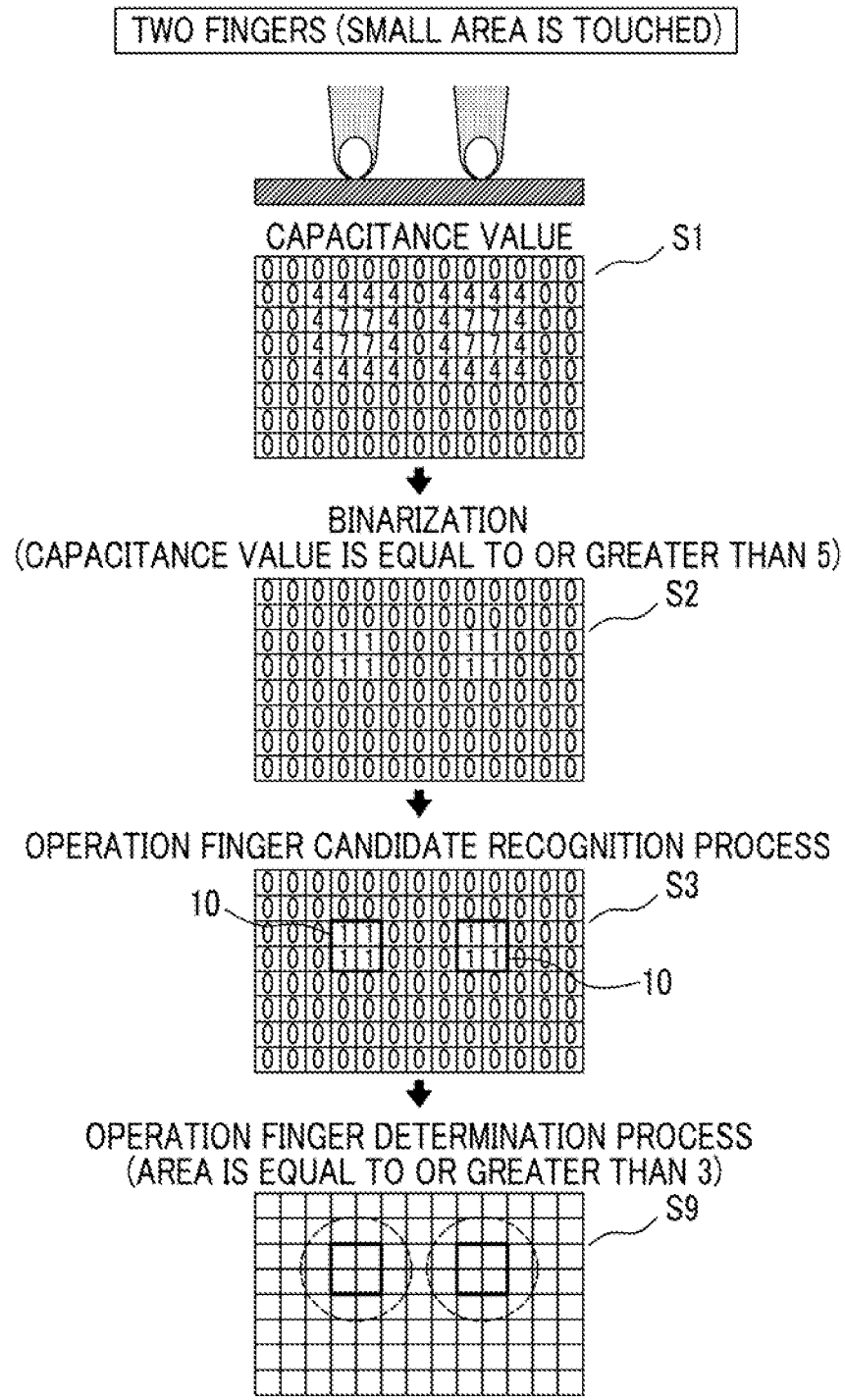
FIG. 6 is a diagram visually illustrating an operation of the control means 6.

FIG. 6 is a diagram visually illustrating an operation of the control means 6 when a small area is touched by two fingers. In a case of a multi-touch, there is a tendency for an operator to perform a touch operation through a lateral side of a thumb or a fingertip due to a structure of a hand, and there is a tendency for a touch area, a touch duration, and the like to be reduced as compared with a case of a single touch. Accordingly, when the threshold value B for neglecting a finger floating in the air, or the like is set to a high value similar to a case of the single touch, there is a greater tendency to determine an operation finger candidate to be an operation invalid target finger, which results in a difficulty in use. However, as illustrated in step S3 of FIG. 6, when there are a plurality of operation finger candidates, the threshold value B is set to a lower value (herein, 3) than that in a case of the single touch. When a touch area of the operation finger candidate exceeds 3, in step S9, the operation finger candidate is determined to be an operation valid target finger. Accordingly, it is possible to suppress a tendency for the operation finger candidate to be determined to be an operation invalid target finger.

As described above, in this embodiment, in a case of one operation finger candidate, when a touch state (touch area) of the operation finger candidate exceeds a first condition (threshold value B=5) which indicates a touch intensity, the operation finger candidate is determined to be an operation valid target finger. When a touch state (touch area) of the operation finger candidate does not exceed the first condition (threshold value B=5), the operation finger candidate is determined to be an operation invalid target finger. In a case of two or more operation finger candidates, when a touch state (touch area) of the operation finger candidate exceeds a second condition (threshold value B=3) which indicates a touch intensity smaller than that of the first condition, the operation finger candidate is determined to be an operation valid target finger. When a touch state (touch area) of the operation finger candidate does not exceed the second condition (threshold value B=3), the operation finger candidate is determined to be an operation invalid target finger.

Accordingly, in a case of a multi-touch, a determination condition is loosely set, and thus it is possible to make it easier to determine a touching finger to be an operation valid target finger. In a case of a single touch, a determination condition is strictly set, and thus an operational effect is exhibited which is capable of making it easier to determine a finger floating in the air to be an operation invalid target finger.

Meanwhile, the present invention is not limited to this embodiment, and can be implemented by adding various modifications without departing from the scope of the present invention. For example, in this embodiment, a method of detecting capacitance has been described. However, the present invention is not limited thereto, and a method of detecting pressure of a finger may be used. In this embodiment, an area is used as a criterion for determination. However, the present invention is not limited thereto, and the duration with respect to a predetermined area, pressure, or the like may be used as a criterion for determination. In addition, the present invention is not limited to a change in a criterion for determination when the number of fingers is one and two or more, and the criterion for determination may be changed when the number of fingers is four and five.

It should be understood by those skilled in the art that various modifications, combinations, sub-combinations and alterations may occur depending on design requirements and other factors insofar as they are within the scope of the appended claims of the equivalents thereof.

What is claimed is:

1. A touch pad comprising:
   an operation surface;
   a detection unit configured to detect proximity of a finger with respect to the operation surface and output a variable signal based on the detected proximity; and
   a control unit configured to recognize at least one operation finger candidate and a number thereof on the basis of the variable signal,
   wherein the control unit is further configured:
   if the number of the at least one operation finger candidate is equal to or less than N where N is a natural number, determine the at least one operation finger candidate as a valid operation target when a touch intensity of the at least one operation finger candidate exceeds a first touch intensity, and determine the at least one operation finger candidate as an invalid operation target when the touch intensity of the at least one operation finger candidate does not exceed the first touch intensity; and
   if the number of the at least one operation finger candidate is equal to or greater than N+1, determine the at least one operation finger candidate as a valid operation target when the touch intensity of the at least one operation finger candidate exceeds a second touch intensity smaller than the first touch intensity, and determine the at least one operation finger candidate as an invalid operation target when the touch intensity of the at least one operation finger candidate does not exceed the second intensity.

2. The touch pad according to claim 1, wherein the touch intensity is an area of contact of the at least one operation finger candidate with the operation surface, the first touch intensity is a first threshold value of the area of contact, and the second touch intensity is a second threshold value of the area of contact, the second threshold value being smaller than the first threshold value.

3. The touch pad according to claim 1, wherein N is one.

4. The touch pad according to claim 1, wherein the control unit is further configured to allow an operation to be performed in accordance with position data of the at least one operation finger candidate if the at least one operation finger candidate is determined as the valid operation target.

5. The touch pad according to claim 1, wherein the touch intensity is a duration of time for which a predetermined contact area of the at least one operation finger candidate with the operation surface is maintained.

6. The touch pad according to claim 1, wherein the touch intensity is a pressure applied by the at least one operation finger candidate onto the operation surface.

* * * * *